United States Patent
Diño et al.

(10) Patent No.: US 6,795,411 B1
(45) Date of Patent: Sep. 21, 2004

(54) METHOD AND APPARATUS FOR CHANGING ASSIGNMENT OF RECEIVER FINGERS

(75) Inventors: Suzanne Hernandez Diño, Arlington Heights, IL (US); Muriel A. Christensen, Palatine, IL (US); Wei Zou, Prospect Heights, IL (US); Ravi K. Iyer, Palatine, IL (US); Dean E. Thorson, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/522,093

(22) Filed: Mar. 9, 2000

(51) Int. Cl.$^7$ ................................. H04Q 7/00
(52) U.S. Cl. ........................ 370/329; 455/522
(58) Field of Search .................. 370/320, 331, 370/332, 334, 335, 341, 342, 431, 441, 462, 464, 329; 455/522

(56) References Cited

U.S. PATENT DOCUMENTS 6,233,456 B1 * 5/2001 Schiff et al. ............... 455/439

\* cited by examiner

Primary Examiner—Wellington Chin
Assistant Examiner—Brenda Pham
(74) Attorney, Agent, or Firm—Lalita W. Pace

(57) ABSTRACT

An apparatus and method changes an assignment of a receiver channel element (302a–302n), such as a RAKE receiver finger based on transmit power control information (212), such as a power control bit or other suitable information, that is used as part of a closed loop transmit power control system between a transmitter and receiver. In one embodiment, a transmit power control information generator (204) produces the transmit power control information (212) on a per channel basis based on received symbol energy (210) of a received spread spectrum signal (202). A receiver channel element management module (206), analyzes the transmit power control information (212) and produces receiver channel element control information (214) to suitably change assignment of receiver channel elements, such as receiver fingers, based on the transmit power control information (212). The reassignment of fingers is rapid and provides close tracking of rapidly changing radio frequency environments.

24 Claims, 6 Drawing Sheets

METHOD AND APPARATUS FOR CHANGING ASSIGNMENT OF RECEIVER FINGERS

FIELD OF THE INVENTION

The invention relates generally to methods and apparatus for controlling an assignment of receiver fingers in a spread spectrum communication system, and more particularly to methods and apparatus for controlling assignment of receiver fingers in a multi-channel spread spectrum communication system.

BACKGROUND OF THE INVENTION

Wireless spread spectrum communication systems are well known. For example, in single channel spread spectrum systems, a mobile station, such as a handheld telephone, Internet appliance, laptop computer or any other suitable device may communicate with one or more base stations over a wireless air interface. Typically, a mobile station is tuned to a single channel, such as a channel that communicates voice information. Multiple mobile stations may be tuned to the same frequency but may be assigned different spreading codes, can be differentiated by time (PN offset) or other suitable differentiation criteria. A receiver, that may be in a base station or in a mobile station, typically includes a plurality of receiver channel elements, such as a plurality of RAKE receiver fingers. Each finger of a RAKE receiver is typically assigned to a different traffic channel (e.g., spreading code). A searcher typically searches a pilot channel for energy peaks to provide receiver channel element management, also known as finger management. For example, the IS95 standard known as TIA/EIA-95-B Mobile Station-Base Station Compatibility Standard for Dual-Mode Spread Spectrum Systems. utilizes pilot power that is detected by a searcher to assign different fingers to receive information during different timing windows. If pilot energy is strong enough, it is assumed that the associated traffic channel is also strong enough. Once suitably adjusted, the energy received by each of the rake fingers is suitably combined and passed to a digital demodulator, such as a Viterbi decoder. Such conventional finger management systems typically use the energy per chip (Ec) per incident noise power (Io) to determine whether the searcher has detected a suitable energy peak at a particular point in time. Accordingly, the searcher provides the peak energy metrics to a finger management algorithm which then provides a receiver finger control signal to adjust a receiver finger to center about a selected window in time. If the searcher determines that the pilot energies are above an allowable threshold, then the finger management system determines if a receiver finger should be assigned to the requisite path or channel. Commonly, each receiver finger is assigned to a base station. Each base station typically has one or more different assigned Walsh codes for forward link (base-to-mobile) transmissions.

A problem arises in systems with multiple simultaneous communication link capabilities such as that described in 3GPP2 C.S0002-A (CDMA 2000 System) where a mobile station may be receiving multiple channels wherein each of the channels requires a different quality of service. For example, a mobile unit may simultaneously require a voice channel at one rate and a data channel at a different rate to provide differing services for a user. Accordingly, a mobile station is forced to manage the radio frequency environment for each channel or service while maintaining a radio frequency link performance that is appropriate for each type of channel. Optimization of received channel energy becomes increasingly important as additional channels are required. Unlike single channel systems, multi-channel systems may have a varying ratio of pilot energy to traffic channel energy since they may use a closed loop transmit power control scheme. The downlink (or uplink) power can be adjusted hundreds of times per second. Accordingly, pilot energy measurements may no longer be an accurate representation of traffic channel energies due to the rapid energy changes induced by fast closed loop power control. For example, a mobile station may send a transmit power control command to a base station every 1.25 milliseconds, thereby requiring a base station, for example, to increase to decrease power of a particular channel very often. In addition, multiple channels are simultaneously active by a mobile so that multiple voice channels may be operational as well as multiple data channels. In addition, multi-channel spread spectrum systems allow the higher rate channels, such as data channels, to be turned on and off during a call. Accordingly, traffic channel energies can vary drastically on a per user basis. Amobile station may be assigned multiple codes or different length codes, so that multiple channels need to be suitably received by a plurality of receiver channel elements, such as RAKE receiver fingers. Accordingly, in multiple channel systems, both a mobile station and a base station can create transmit control information such as power control bits (PCB's) and tell each other to increase or decrease traffic channel power on a very rapid basis. Therefore, total pilot energy may not be a sufficient indicator of traffic channel energy. With more channels operating simultaneously in the rapidly changing channel power and different channel rates, determining receiver finger assignments can be quite difficult.

Accordingly, a need exists for a method and apparatus for controlling a plurality of receiver channel elements in a spread spectrum communication system.

DETAILED DESCRIPTION OF THE PREFERRED EMBODIMENT

Briefly, an apparatus and method changes an assignment of a receiver channel element, such as a RAKE receiver finger based on transmit power control information, such as a power control bit or other suitable information, that is used as part of a closed loop transmit power control system between a transmitter and receiver. In one embodiment, a transmit power control information generator produces the transmit power control information on a per channel basis based on received symbol energy of a received spread spectrum signal. A receiver channel element management module analyzes the transmit power control information and produces receiver channel element control information to suitably change assignment of receiver channel elements, such as receiver fingers, based on the transmit power control information. The reassignment of fingers is rapid and provides close tracking of rapidly changing radio frequency environments. Accordingly, information normally used as transmit power control information for a transmitter sending a signal is also used for controlling assignment of receiver fingers in, for example, a RAKE receiver.

In one embodiment, a measurement of the ratio of the incoming energy per symbol (Es) to the incident received noise power (Ior) is used to provide a metric to determine received signal quality. This metric may be evaluated with reference to a group of channels or a list of services that are active on each receiver finger to provide a level of finger performance. If received symbol energy is below a threshold value, appropriate change of assignment may occur. In another embodiment, changing of the assignment of a receiver channel is performed based on transmit power control information history.

Figure 1:
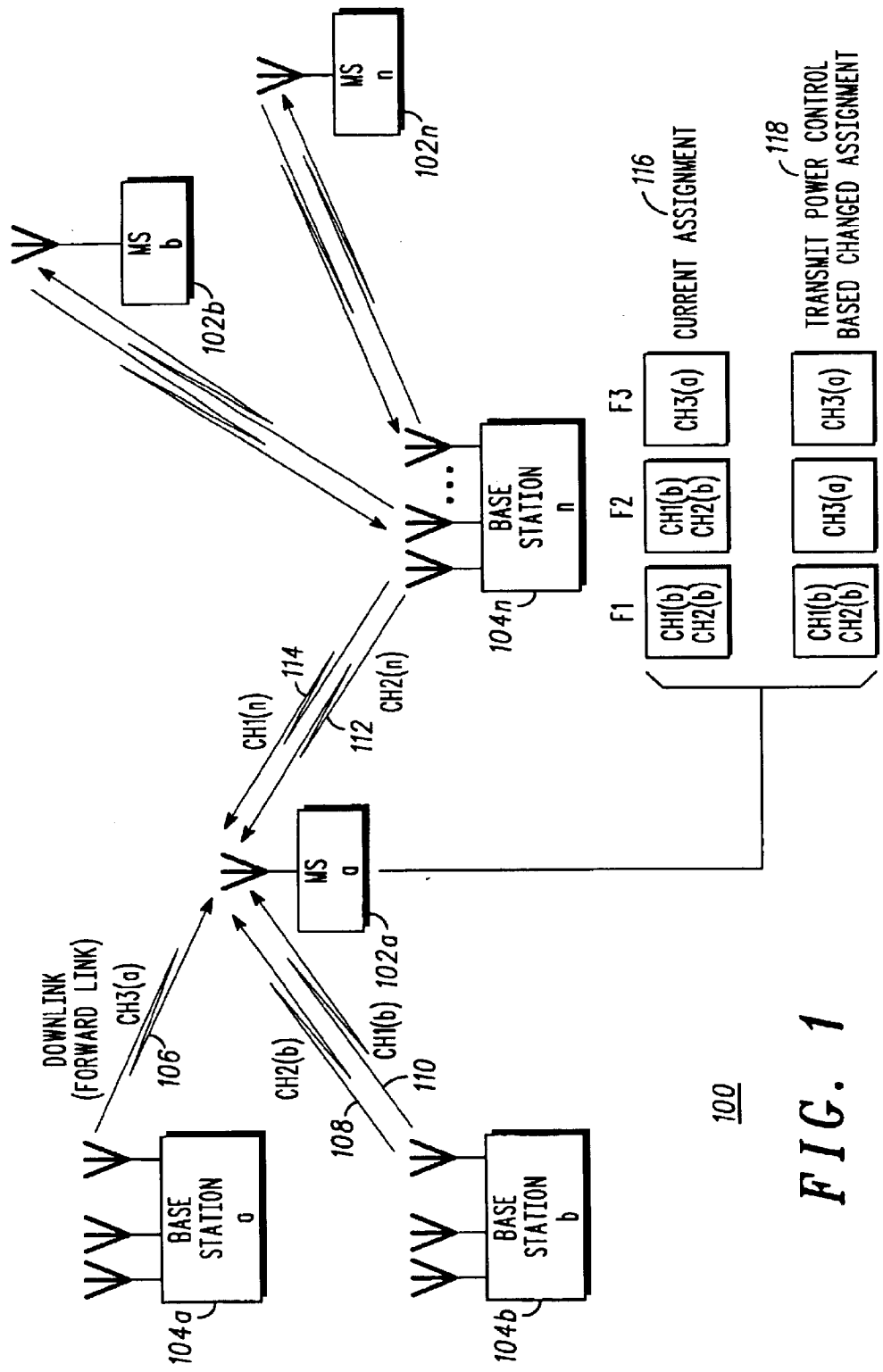
FIG. 1 illustrates a block diagram of a spread spectrum communication system in accordance with one embodiment of the invention.

FIG. 1 illustrates a spread spectrum wireless communication system, such as a code division multiple access (CDMA) multichannel communication system 100, that includes a plurality of mobile stations 102a–102n in operative communication with one or more base stations 104a–104n. The multichannel communication system 100 transmits and receives spread spectrum signals. For purposes of illustration, and not limitation, the disclosed invention will be described with reference to a CDMA 2000 cellular system as described, for example, in the specification entitled, "Physical Layer Standard for CDMA 2000 Spread Spectrum Systems" (3GPP2 C.S0002-A) Version 55, available at www.3gpp2.org and incorporated herein by reference. However, it will be recognized by one of ordinary skill in the art that the disclosed methods and apparatus may be applicable to any suitable spread spectrum system. By way of example, mobile station 102a may be operating in a simultaneous voice and data mode. Accordingly, one or more base stations 104–104n may be communicating traffic channel and pilot channel information for the mobile station 102a. In this example, base station 104a is communicating downlink signal 106 as a voice channel CH3a (fundamental channel (FCH)). Base station 104b is communicating downlink signals 108 and 110, such as data channel Ch2b and dedicated control channel Ch1b. Base station 104n is communicating downlink signals 112 and 114, namely channel Ch2n (such as a data channel e.g., a supplemental channel (SCH)) and channel Ch1n, (such as a dedicated traffic channel). Receiver channel elements of the mobile station, such as receiver fingers, are assigned to receive the downlink signals.

As shown, a current finger assignment 116 indicates that receiver channel element F1 is currently assigned to channel Ch1b from base station 104b and channel Ch2b from base station 104b. Likewise, receiver channel element F2 is assigned to a multipath component (a spread-spectrum signal arriving at a different time) of channel Ch2b from base station 104b and channel Ch1b from base station 104b and so on. Depending upon determined transmit power control information that is sent to each of the base stations to control the transmit power of the base stations for the downlink signals, the mobile station 102a may change an assignment of at least one of a plurality of the receiver channel elements F1–F3, to receive a different signal, such as a different channel (e.g., window, spreading code, PN offset, etc.), based on the transmit power control information. For example, a change of assignment 118 may be carried out by the mobile station so that the receiver channel elements F1 and F3 are assigned to maintain their original assignments but receiver channel element F2 has been assigned to different channels as shown. In the cited example, the transmit power control information based upon current finger assignment 116 has determined that adequate energy is being received on Ch1b and Ch2b. Further, the transmit power control information has shown that inadequate energy is being received on Ch3a. Mobile station 102a may then perform the change of assignment to finger assignment 118 to re-assign F2 to a multipath component of Ch3a to increase the energy received on Ch3a, while maintaining adequate energy on Ch1b and Ch2b. For example, a reassignment may have occurred because a received signal with a higher pilot signal energy has been detected and the receiver channel element management system needs to assign a finger to that signal but needs to drop a current finger in order to receive the higher energy channel associated with the higher pilot signal energy. Conversely, a change of assignment may occur when the mobile station must insure that each base station is assigned at least one receiver channel element and that each channel is assigned to enough receiver channel elements so that satisfactory energy is received and, for example, that all strong paths of active base stations are covered by receiver channel elements, if possible.

Figure 2:
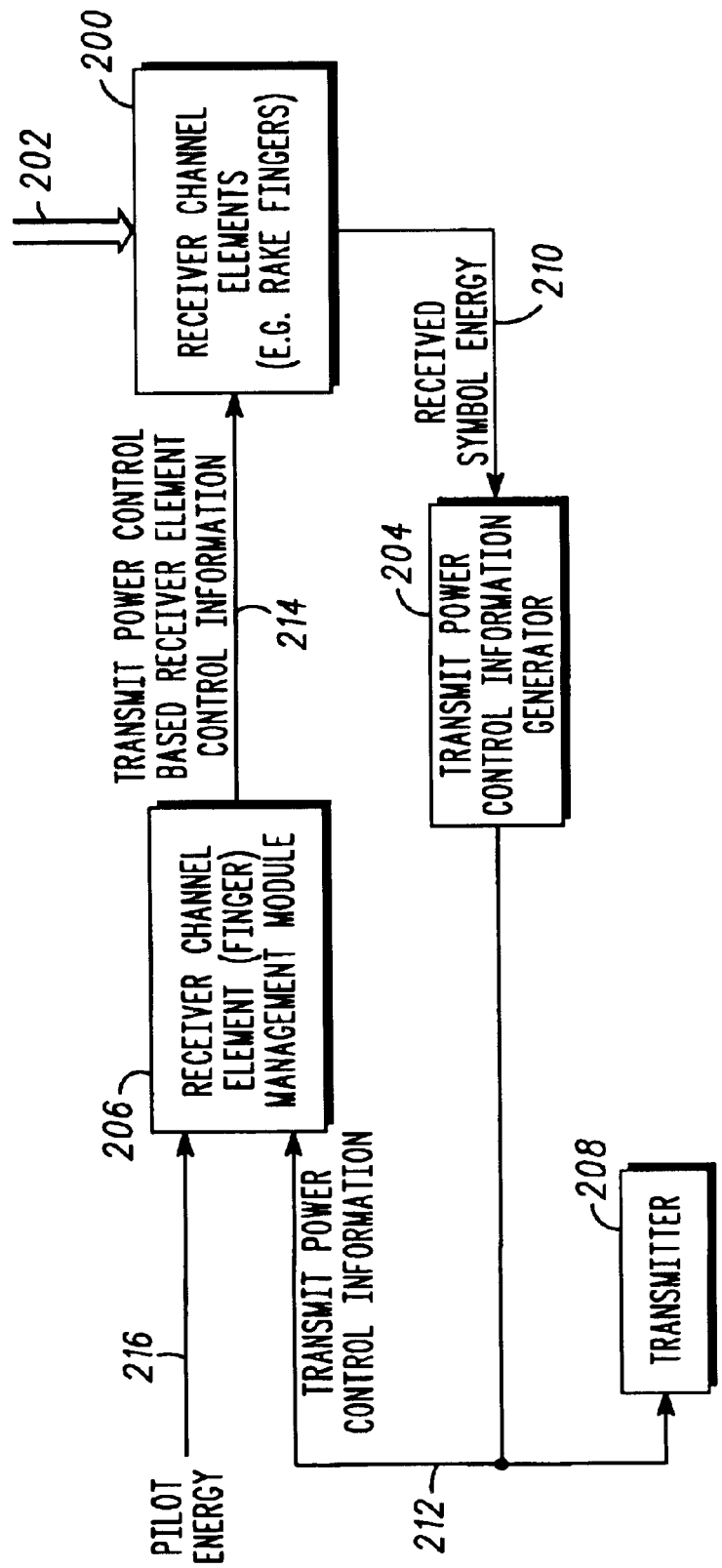
FIG. 2 is a block diagram illustrating one example of an apparatus employing a receiver channel element management module in accordance with one embodiment of the invention. Unit

FIG. 2 illustrates one example of a receiver unit, such as in a wireless mobile station or a wireless base station unit, that includes a plurality of receiver channel elements 200 operative to receive spread spectrum signals 202. The receiver also includes a transmit power control information generator 204, a receiver channel element module 206, and a transmit stage 208. The receiver channel elements 200 may be, for example, receiver fingers, and produce received symbol energy 210 on a per channel basis. As used herein, channel may include, for example, non-broadcast channels such as traffic channels, control channels, or any other suitable channels, different frequencies, spreading codes, spreading lengths, different receiver timing windows or any other suitable channel differentiation criteria. The transmit power control generator 204 produces transmit power control information 212, such as a power control bit, or other suitable information that is communicated to a transmit stage 208 for transmission to a base station or other suitable transmitter that transmits a signal that is received by the receiver channel elements 200. The transmit power control information 212 indicates whether to increase or decrease transmit power of individual channels. One example of transmit power control information, includes power control bits as described, for example, in the specification entitled, "Physical Layer Standard for CDMA 2000 Spread Spectrum Systems" (3GPP2 C.S0002-A) Version 55.

The transmitter 208 is operative to transmit the power control information 212 to a base station transmitter to control a base station transmit power of the received signal. Alternatively, where the device is incorporated in a base station receiver, the transmitter 208 is operative to transmit the transmit power control information to a mobile station transmitter to control a mobile station transmit power.

The receiver channel element management module 206 may be a suitable software algorithm executed on a processing device, a hardware circuit, combination of hardware and software or any other suitable structure that is responsive to the transmit power control information 212 and produces receiver channel element control information 214 to control each of the receiver channel elements to change assignment of at least one of the channel elements to receive a different signal when appropriate. Accordingly, the receiver channel element management module 206 utilizes transmit power control information 212 as a basis for determining whether to change assignment of a receiver finger. The receiver channel element management module 206 is also operatively responsive to pilot energy 216 that may be derived, for example, from a received pilot signal. The combination of the pilot energy 216 in conjunction with the transmit power control information 212 allows the receiver channel element management module 206 to determine whether a change of receiver finger assignment is suitable. Accordingly, the transmit power control information 212 is used not only as transmit power control information to control the transmit power of a base station transmitter or other suitable transmitter, but is also used to control receiver channel elements to enhance channel performance for a receiver.

Figure 3:
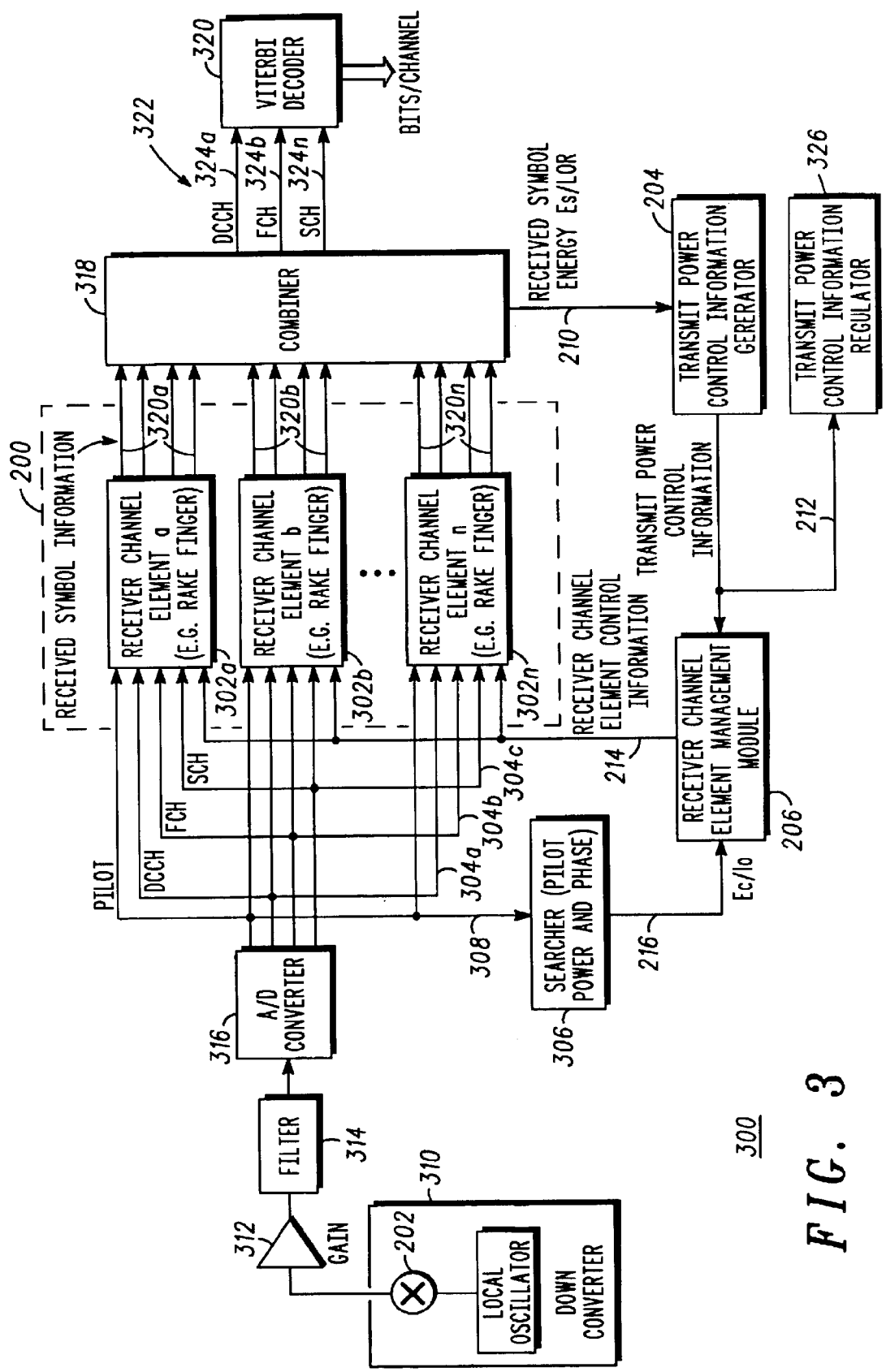
FIG. 3 is a block diagram illustrating one example of a wireless mobile unit receiver in accordance with one embodiment of the invention.

FIG. 3 shows one example of a wireless receiver 300 in accordance with one embodiment of the invention. The wireless receiver 300 includes a plurality of receiver channel elements 302a–302n that are each operative to receive spread spectrum signals 304a–304c, such as a dedicated control channel 304a, one or more traffic channels such as voice channel 304b, a supplemental channel, such as a data channel 304c; and any other suitable channels as desired. The spread spectrum signals 304a–304c may be transmitted, for example, by a plurality of base stations (or a single base station) such that each receiver channel element 302a–302n is dedicated for a specific base station, however any suitable assignment may also be used. The receiver 300 may also include a searcher 306 operative to search for energy peaks within a pilot signal 308, as known in the art, to obtain a pilot signal energy profile indicating energy levels and phase information. The searcher 306 measures the pilot energy 216 such as Ec/Io to obtain the pilot energy per time profile, as known in the art. This may provide, for example, an energy per chip indication. The searcher 306 is operative to determine pilot signal phase information, such as pilot energy information 216 and a receiver element sample window to assign the receiver channel elements 302a–302n to receive a different signal, or window based on the receiver element sample window. The receiver 300 may also include a suitable down converter 310, a gain stage 312, a suitable filter stage 314, and an analog to digital conversion stage 316, as known in the art. The wireless receiver 300 also includes a combiner 318 and digital demodulator 320, such as a Viterbi decoder.

Each receiver channel element 302a–302n is operatively responsive to the transmit power control based receiver element control information 214 so that each receiver channel element may be suitably controlled to be assigned to a specific time window and to receive a different signal (i.e., channel 304a–304c) associated with a particular transmitter, such as a base station. Each receiver channel element 302a–302n produces received symbol information 320a–320n which includes the received symbol energy 210 on a per channel basis, such as energy per symbol per incident received noise power represented as Es/Ior. The plurality of receiver channel elements 302a–302n receive the multi-channel spread spectrum signal 202 which includes the plurality of channels 304a–304c from each base station, for example. The plurality of multi-channel spread spectrum signals may include different rate spread spectrum information. For example, the fundamental channel 304b may require information at a rate suitable for voice communication whereas the supplemental channel 304c may provide information sent at a higher rate for data transfer. In addition, the received symbol information 320a–320n includes correlated samples.

In addition, at least a first channel of all channels that a receiver channel element receives may be associated with a first time window of acquisition. At least a second channel that the receiver channel element receives may be associated with the same time window of acquisition. This may be desirable where a receive element is assigned to a multipath component of a spread spectrum signal. The multipath component is another image of the transmitted signal, delayed by channel propagation. Multipath components can be used in spread spectrum systems to provide an additional un-correlated source of information.

The combiner 318 which may be a hardware or software combiner, suitably combines the outputs from the various receiver channel elements to provide combined sample outputs per channel at a symbol rate represented as information 322 for the Viterbi decoder 320. The Viterbi decoder outputs bits per channel for each of the channels 324a–324n as known in the art.

The receiver 300 also includes a transmit power control information register 326 that stores a current transmit power control bit or other suitable transmit power control information 212 for transmission to a downlink transmitter, such as a base station. The transmit power control information register 326 may also store a history on per channel basis of the transmit power control information 212.

Accordingly, the receiver 300 receives channels that are associated with different service requirements wherein, for example, one channel is associated with high rate data transfer, another channel is associated with voice communication, another channel may be associated with a lower rate data transfer, or any other suitable service. The receiver channel element management module 206 considers multiple simultaneous channel reception to determine a suitable receiver channel element assignment.

Figure 4:
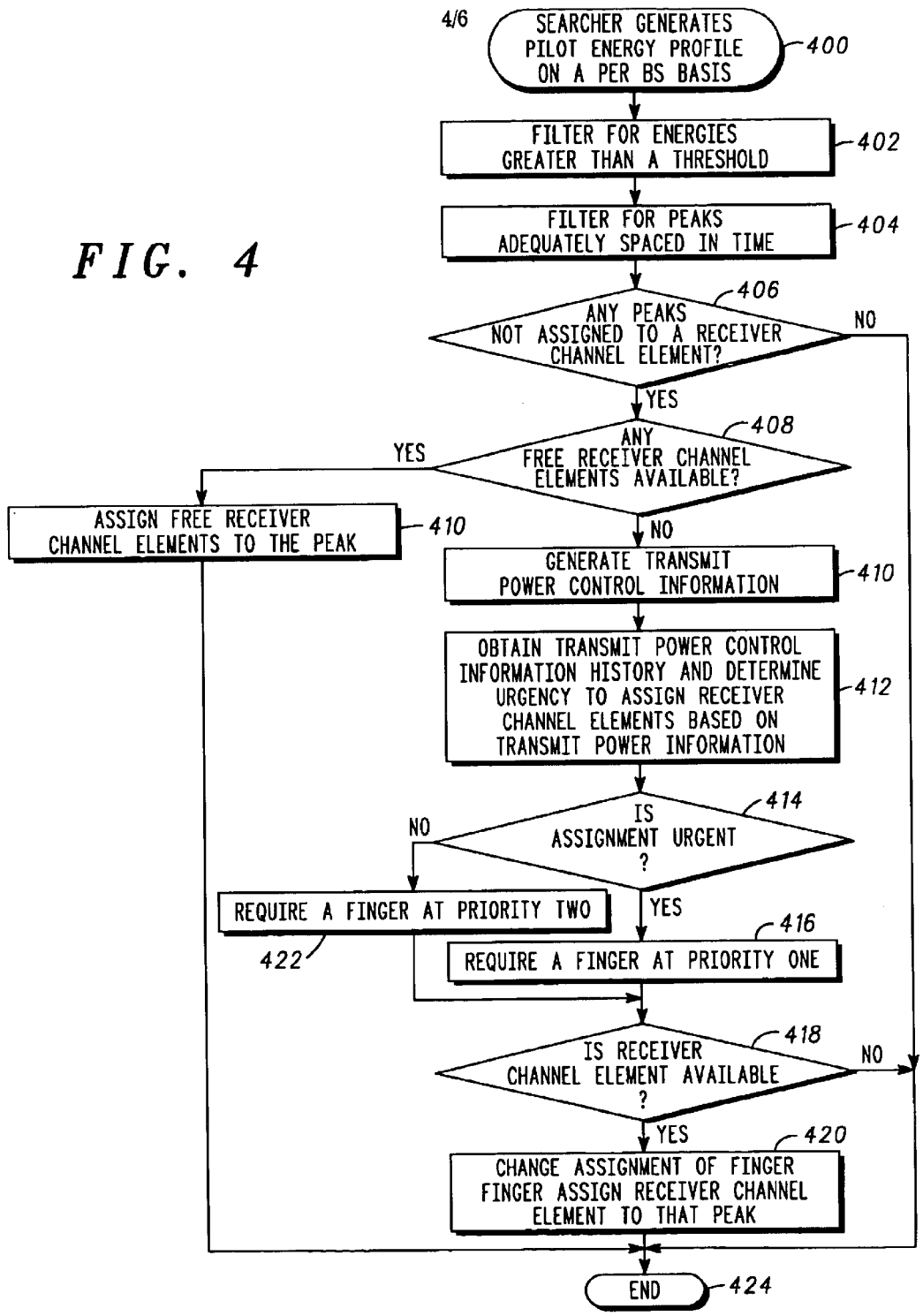
FIG. 4 is a flowchart illustrating one example of a method for controlling a plurality of receiver channel elements in accordance with one embodiment of the invention.

FIG. 4 illustrates one example of a method for controlling a plurality of receiver channel elements in accordance with one embodiment of the invention. As shown in block 400, the method begins by the searcher 306 generating the pilot energy profile on a per receiver channel element basis (e.g., base station basis) or any other suitable basis to obtain phase and timing window information. As shown in block 402, the method includes filtering the pilot energy profiles for energies that are greater than a threshold. As shown in block 404, the finger management system 206 filters for energy peaks that are adequately spaced in time, as known in the art. As shown in block 406, the method includes determining if any peaks associated with any of the channels are not assigned to a received channel element. If all peaks are currently assigned, the process ends as shown in block 424. However, if one of the energy peaks that is greater than a desired threshold is not assigned to a receiver channel element, the method includes determining if any received channel elements are available for assignment, as shown in block 408. This is determined, for example, by querying a database containing the status of each of the receiver channel elements. This can also be determined by maintaining a list of assignment status information or by any other suitable process. As shown in block 409, the method includes determining at least a received symbol energy from the received symbols on a per channel basis, such as determining Es/Ior on a per element and per channel basis, such as by the transmit power control information generator 204. This includes analyzing the received symbol energy to generate the transmit power control information, such as a power control bit (PCB). The PCB is generated every 1.25 msec, but may be generated at any other suitable interval. This is done, for example, by comparing the received symbol energy to an energy threshold. If the received symbol energy is beyond the threshold, the transmit power control information, may indicate, for example, that a transmit power decrease should occur and accordingly a "1" bit may be sent to the transmitter.

Conversely, if the received symbol energy is below a desired threshold, meaning that the received energy is too low and that the transmit power should be increased, the transmit power control information may be a power control bit set equal to "0" indicating that the base station should increase the downlink transmit power. If there is a free received channel element that is available, the method includes assigning the free channel receiver element to the channel and timing window associated with the detected peak, as shown in block 410. However, if a peak has been detected but no free receiver channel elements are available, the process continues to block 412. The method includes obtaining the transmit power control information history for a given channel associated with the peak energy, to determine the urgency to assign a received channel element. (See FIG. 5). The transmit power control information history is stored for each receiver element on an ongoing basis. In one embodiment, the last three transmit power control bits (PCB's) are stored as the history.

As shown in block 414, if it is determined that the assignment is urgent, the process continues to block 416 wherein a top priority is made to change assignment of a receiver channel element to assign the channel associated with the peak to a suitable receiver channel element. In order to do this, the method includes determining whether a received channel element that is already assigned to a peak can be reassigned, as shown in block 418. If such a receiver channel element is available, the method includes assigning the received channel element to the channel and timing window associated with the detected peak, as determined by the searches as shown in block 420. This includes changing an assignment of one of the received channel elements to receive a different signal based on the transmit power control information.

Returning back to block 414, if it is determined from the transmission power control information history that the assignment is not urgent, the method includes attempting to assign a receiver channel element at a lower priority, as shown in block 422.

It will be recognized that the various steps may be performed in any suitable order and, for example, that the step of determining received symbol energy and generating the transmit power control information may occur in parallel with a number of other steps.

Figure 5:
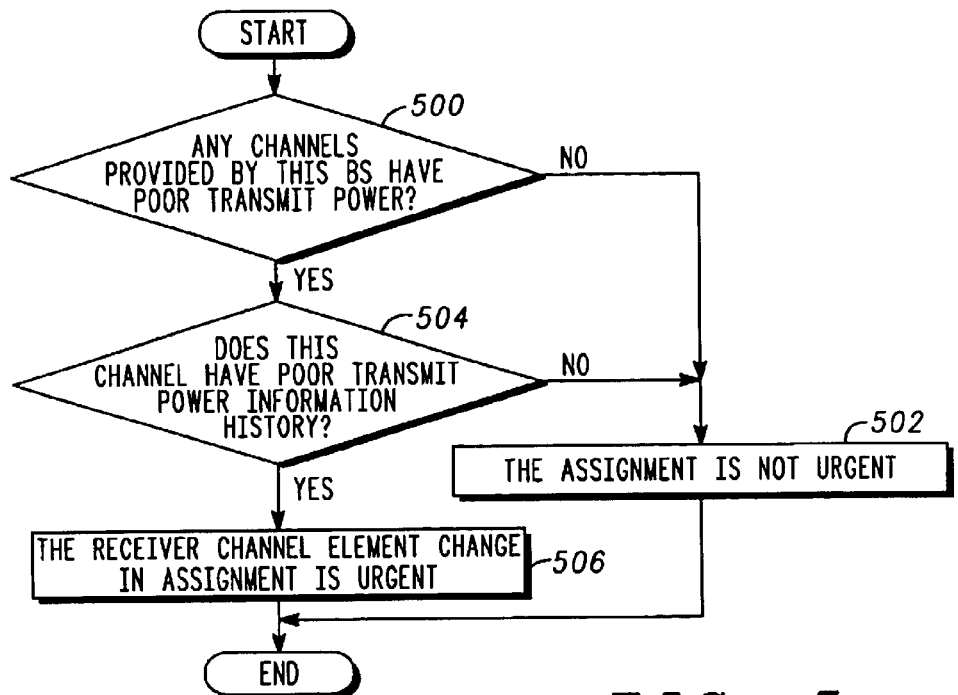
FIG. 5 is a flowchart illustrating one example of a method for deciding the urgency to change an assignment of a receiver channel element in accordance with one embodiment of the invention.

FIG. 5 is a flow chart illustrating one example of the process for determining the urgency to assign a received channel element as shown in block 412 of FIG. 4. As shown in block 500, a method for changing assignments includes determining an urgency for changing the assignment of a receiver channel element based upon a per channel history of the transmit power control information in comparison with a current transmit power control bit. For example, the receiver channel element management module evaluates the transmit power control information, such as a power control bit associated with a channel being transmitted by the base station of interest to determine whether a low channel energy is detected. For example, a current PCB is evaluated. If the current power control bit (PCB) is equal to one, meaning that downlink transmit power should be decreased, it indicates that the channel's energy is good at the moment. Accordingly, the assignment is not urgent as shown in block 502. As shown in block 504, if the current PCB is, for example, equal to zero, indicating that the channel energy is currently low requiring the downlink transmission to increase in power, the method includes determining whether this channel has a poor transmit power information history. This may be determined, for example, by evaluating the last three PCB bits communicated for this channel. If the channel has poor transmit power information history, for example, if the previous three or more PCB bits are all equal to zero, meaning that the closed loop power control failed to bring the channel energy back to a desired level, the method includes determining that the received channel element change in the assignment is urgent, as shown in block 506. Accordingly, it is not safe to reassign the finger or fingers that are now serving the channel and it is urgent to assign more fingers to serve this channel. The following Table 1 summarizes the decision carried out by the receiver channel element management module.

TABLE 1

| Current Transmit Power Control Info. (PCB and History | | Receiver Channel Element Management Module |
|---|---|---|
| Current PCB = 1 | This channel's energy is good at this moment | It is safe to reassign the fingers that are serving this channel (such as reassign a finger from a weak path to a stronger path) |
| Current PCB = 0 Previous PCB's are not all '0' | This channel's energy is poor at this moment. But, it is still possible that the closed loop power control will bring the channel energy back. | (1) it is not safe to reassign the fingers which are now serving this channel. (2) It is not urgent to assign additional fingers to this channel |
| Current PCB = 0 Previous PCB's are All '0' | This channel's energy is bad at this moment. Also, the closed loop power control failed to bring the channel energy back. | (1) It is not safe to re-assign the fingers that are now serving this channel (2) It is urgent to assign more fingers to serve this channel. |

Figure 6:
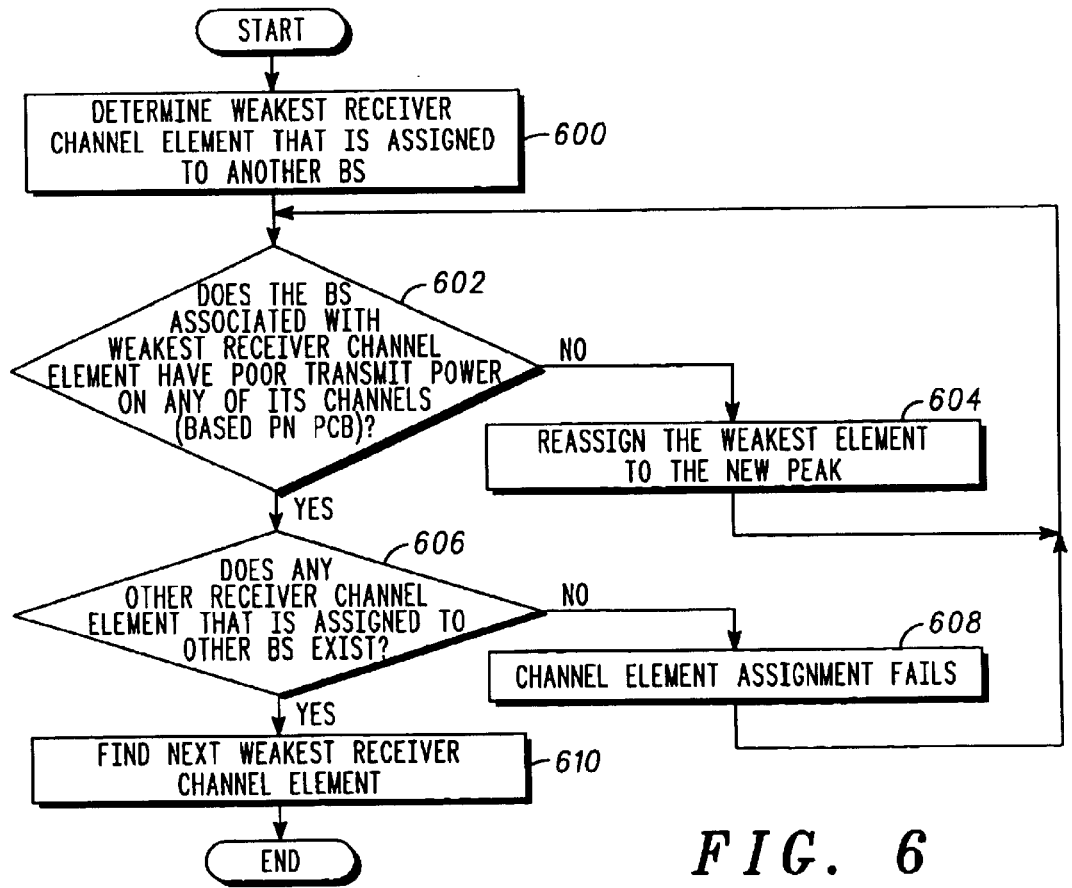
FIG. 6 is a flowchart illustrating one example of a method for changing an assignment of a receiver channel element in accordance with one embodiment of the invention.

FIG. 6 is one method for carrying out the step of block 416 of FIG. 4. As shown in block 600, since the assignment is urgent, a priority 1 condition is assumed to quickly obtain a receiver channel element. Accordingly, the method includes determining the weakest channel element that is assigned to another base station. This is determined by, for example, querying energy measurements from the receive hardware for all receiver channel elements assigned to all other base stations and sorting these measurements . As shown in block 602, the method includes determining whether the base station associated with the weakest received channel element has poor transmit power on any of the channels that a base station provides, which is determined based on the PCB associated with the channels of the weakest received channel element. In one embodiment, this analysis is done for all channels associated with that received channel element. If the base station associated with the weakest received channel element does not have poor transmit power on any of the channels it provides, the method includes reassigning the weakest receiver channel element to the new peak channel, as shown in block 604. However, if the base station associated with the weakest received channel element does have poor transmit power on any of the channels it provides, the method includes determining whether any other received channel elements that are assigned to other base stations exist, as shown in block 606. Accordingly, if changing the assignment is urgent, the method includes determining the weakest receiver channel element of at least one of the receiver channel elements and changing the assignment of the weakest receiver channel element to a different channel.

As shown in block 608, if there is no other receiver channel element that is assigned to other base stations, the received channel element assignment fails. However, if there is another received channel element that is assigned to another base station, the method includes finding the next weakest received channel element as shown in block 610 and continuing until the receiver channel element assigned to the weakest channel is found or until all receiver channel elements have been examined.

Figure 7:
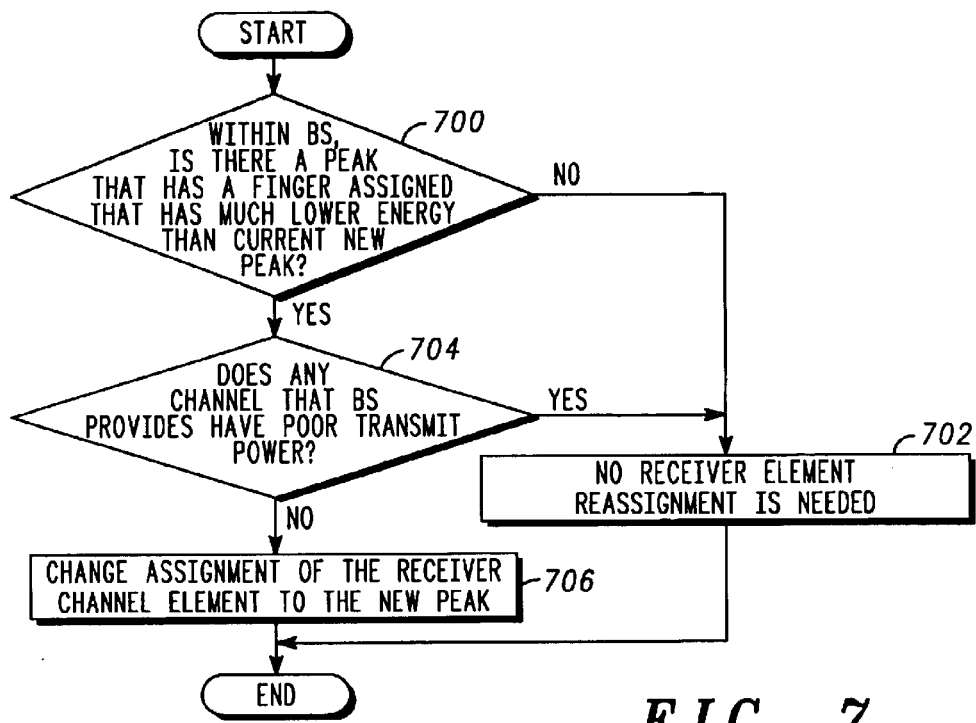
FIG. 7 is a flowchart illustrating one example of a method for changing an assignment of at least one receiver channel element in accordance with one embodiment of the invention.

FIG. 7 illustrates one method for obtaining a receiver channel element for a lower priority. As shown in block 700, the method includes evaluating the channels associated with a given receiver channel element and determining whether there is a peak that has a finger assigned that has a much lower energy than the new peak that is detected. If not, the method includes determining that no receiver channel element reassignment is required as shown in block 702. However, as shown in block 704, if there is a peak that has a finger assigned that has much lower energy than the current new peak, the method includes determining whether any channel that the BTS provides has poor transmit power, based on the PCB level. If none of the channels received by the receive element for the associated base station has poor transmit power, the method includes reassigning the finger associated with the poor transmit power to the new peak, as shown in block 706.

Accordingly, changing assignments can include determining whether received symbol energy is both below a threshold value for all channels that a receiver channel element receives, to produce the transmit power control information on a per channel basis for each received channel. The method also includes determining whether the receiver channel element pilot energy is weakest of all receiver channel elements currently assigned and determining whether more than one receiver channel element is currently receiving a channel received by at least one other channel element. The changing of the assignment is carried out when the receiver channel element with the weakest pilot energy is changed to a channel with a higher pilot energy, when a pilot energy may be determined, for example, by the searcher.

Figure 8:
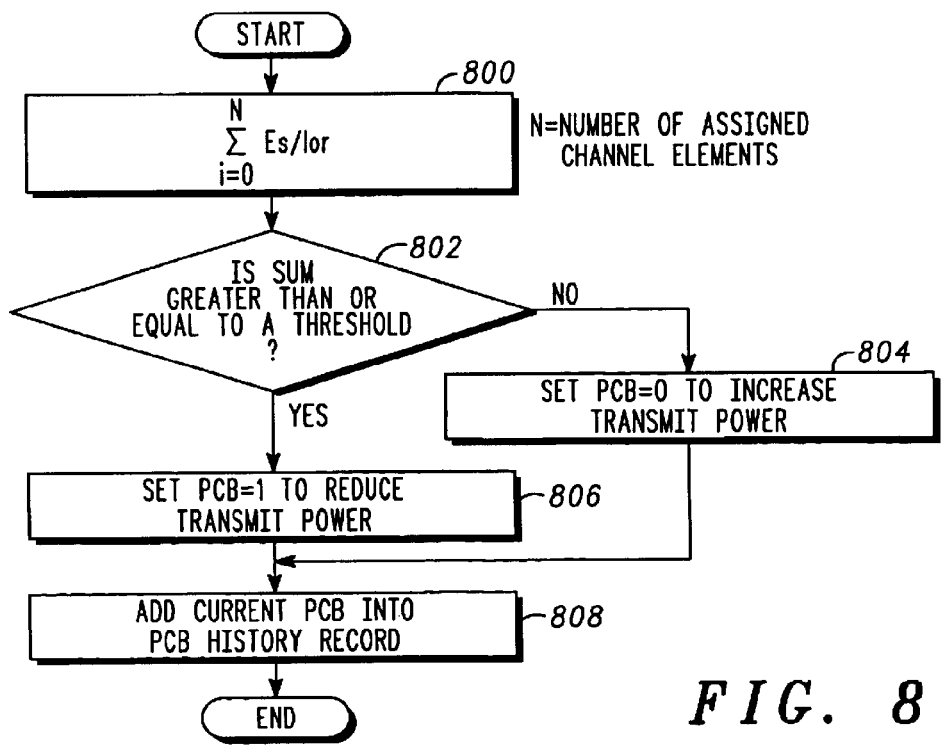
FIG. 8 is a flowchart illustrating one example of a method for determining transmit power control information in accordance with one embodiment of the invention.

FIG. 8 illustrates one example of a method for determining the transmit power control information, such as a PCB bit. As shown in block 800, the sum of the received symbol energy for a number of assigned fingers is determined for each channel. As shown in block 802, the method includes determining whether the sum is greater than or equal to a threshold. If not, the method includes setting the transmit control information, such as a power control bit equal to zero, to indicate that the transmitter of the base station (or mobile station) should increase the transmit power as shown in block 804.

However, if the sum of the received symbol energy on a per channel basis is greater than the threshold, the method includes setting the PCB equal to 1 to reduce the transmit power shown in block 806. The current PCB is then added into the PCB history record as shown in block 808.

Accordingly, a method and apparatus can use a searcher's result and a current status of channel energies to decide if a sector or base station needs more fingers assigned to its transmission and how urgent the assignment of the fingers is. If a base station needs a finger but the need is not urgent, the receiver channel element module only searches for free fingers or locked fingers of the current sector and assigns or reassigns the finger to the sector's new peak.

If a base station needs a finger urgently, the receiver channel element management module first checks if there are any free receiver channel elements available. If there are no free channel elements available, the receiver channel element management module evaluates all the locked fingers to find one that is suitable to be reassigned. Accordingly, it is possible to reassign a locked finger from one sector to another or reassign a locked finger from serving one channel to serving another channel. The receiver channel element management module uses the transmit power control information to decide the urgency to require additional fingers.

It will be recognized that the transmit power control information generator 204 and the receiver channel element management module 206 may be suitably implemented as one or more algorithms and performed by a suitable processing device such as a DSP, microcontroller, or any other suitable processing device, or may be suitably implemented in hardware or a combination of hardware, software, or firmware, if desired.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for controlling a plurality of receiver channel elements in a communication system transmitting and receiving spread spectrum signals, at least two of the plurality of receiver channel elements assigned to a received signal of the spread spectrum signals, comprising:

determining at least a received symbol energy from the received signal;

analyzing the received symbol energy to generate transmit power control information;

changing an assignment of at least one of the at least two receiver channel elements to receive a different signal based on the transmit power control information;

wherein the received signal and the different signal are transmitted from different transmitters in the communication system; and obtaining pilot signal energy information to determine pilot signal phase information and a receiver element sample window to assign the at least one of the at least two receiver channel elements to receive a different signal based on the receiver element sample window.

2. The method as recited in claim 1 wherein the transmit power control information is associated with a downlink signal of the spread spectrum signals, wherein the downlink signal is transmitted from a base station to a mobile station in the communication system.

3. The method as recited in claim 2 wherein the plurality of receiver channel elements are associated with a base station.

4. The method as recited in claim 1 wherein the transmit power control information is associated with an uplink signal of the spread spectrum signals, wherein the uplink signal is transmitted from a mobile station to a base station In the communication system.

5. The method as recited in claim 4 wherein the plurality of receiver channel elements are associated with a mobile station.

6. The method as recited in claim 1 wherein the received signal and the different signal are transmitted from a same transmitter in the communication system.

7. The method recited in claim 1 wherein the step of analyzing the received symbol energy to generate transmit power control information (PCB) comprises analyzing the received symbol energy on a per channel basis.

8. The method recited in claim 1 wherein the receiver channel elements comprise a plurality of RAKE receiver fingers.

9. The method recited in claim 1 wherein the step of changing assignments comprises:
   determining whether a received symbol energy is below a threshold value for all channels that a receiver channel element receives to produce the transmit power control information on a per channel basis for each received channel;
   determining whether a receiver channel element pilot energy is weakest of all receiver channel elements currently assigned; and
   determining whether more than one receiver channel element is currently receiving a channel received by at least one other receiver channel element.

10. The method recited in claim 9 comprising the step of changing the assignment of a receiver channel element with a weakest pilot energy to a channel with a higher pilot energy.

11. The method recited in claim 9 wherein at least a first channel of all channels that a receiver channel element receives is associated with a first time window of acquisition and wherein at least a second channel that the receiver channel element receives is associated with a second time window of acquisition.

12. The method recited in claim 9 wherein at least a first channel of all channels that a receiver channel element receives is associated with a first spreading code and wherein at least a second channel that the receiver channel element receives is a associated with a second spreading code.

13. The method recited in claim 1 wherein the step of changing assignments comprises:
   determining an urgency for changing the assignment of a receiver channel element based upon a per channel history of the transmit power control information;
   if changing the assignment is urgent, determining a weakest receiver channel element of the at least two receiver channel elements; and
   changing the assignment of the weakest receiver channel element to a different channel.

14. The method recited in claim 1 comprising the step of receiving, by the plurality of receiver channel elements, a multi-channel spread spectrum signal and wherein the plurality of signals comprise different rate spread spectrum information.

15. The method recited in claim 1 further comprising the step of transmitting the transmit power control information to a transmitter to control a downlink transmit power of the received signal.

16. A wireless receiver having a plurality of receiver channel elements operative to receive spread spectrum signals, at least two of the plurality of receiver channel elements assigned to a received signal of the spread spectrum signals, comprising:
   a transmit power control information generator, operatively coupled to the at least two of the plurality of receiver channel elements, operative to produce transmit power control information on a per channel basis based on received symbol energy of the received spread spectrum signals,
   a receiver channel element management module, operatively coupled to the at least two of the plurality of receiver channel elements, and responsive to the transmit power control information to produce receiver channel element control information based on the transmit power control information to change assignment of at least one of the least two receiver channel elements to receive a different signal; and
   a searcher operative to determine pilot signal phase information and a receiver element sample window to assign the at least one of the least two receiver channel elements to receive a different signal based on the receiver element sample window.

17. The wireless receiver of claim 16 wherein the receiver channel elements comprise a plurality of RAKE receiver fingers.

18. The wireless receiver of claim 16 wherein the receiver channel element management module determines whether a received symbol energy is below a threshold value for all channels that a receiver channel element receives to produce the transmit power control information on a per channel basis for each receiver channel element; determines whether a receiver channel element pilot energy is weakest of all receiver channel elements currently assigned; and determines whether more than one receiver channel element is currently receiving a channel received by as least one other receiver channel element.

19. The wireless receiver of claim 18 wherein the receiver channel element management module changes the assignment of a receiver channel element with a weakest pilot energy to a channel with a higher pilot energy.

20. The wireless receiver of claim 16 wherein the receiver channel element management module determines an urgency for changing the assignment of a receiver channel element based upon a history of the transmit power control information; if changing the assignment is urgent, determines a weakest receiver channel element of the at least two receiver channel elements; and
   changes the assignment of the weakest receiver channel element to a different channel.

21. The wireless receiver of claim 16 wherein the plurality of receiver channel elements, receive a multi-channel spread spectrum signal and wherein the plurality of signals comprise different rate spread spectrum information.

22. The wireless receiver of claim 16 comprising a transmitter operative to transmit the transmit power control information to a base station transmitter to control a base station transmit power of the received signal.

23. The wireless receiver of claim 16 wherein the wireless receiver is incorporated as part of a mobile station.

24. The wireless receiver of claim 16 wherein the wireless receiver is incorporated as part of a base station.

* * * * *